March 24, 1942.  G. V. WOODLING  2,277,285
MEASURING DEVICE
Original Filed April 22, 1932  6 Sheets-Sheet 1
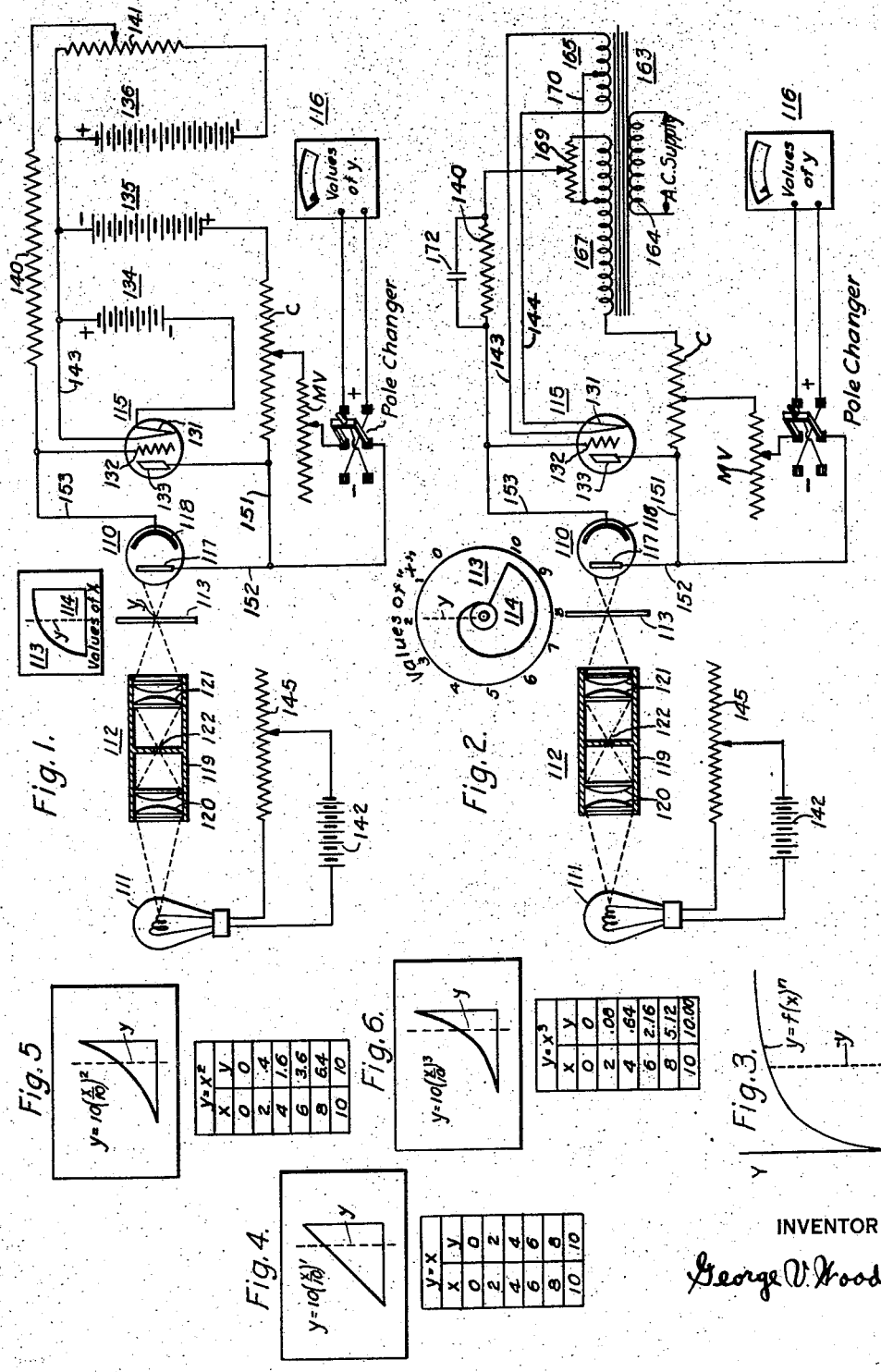
INVENTOR
George V. Woodling

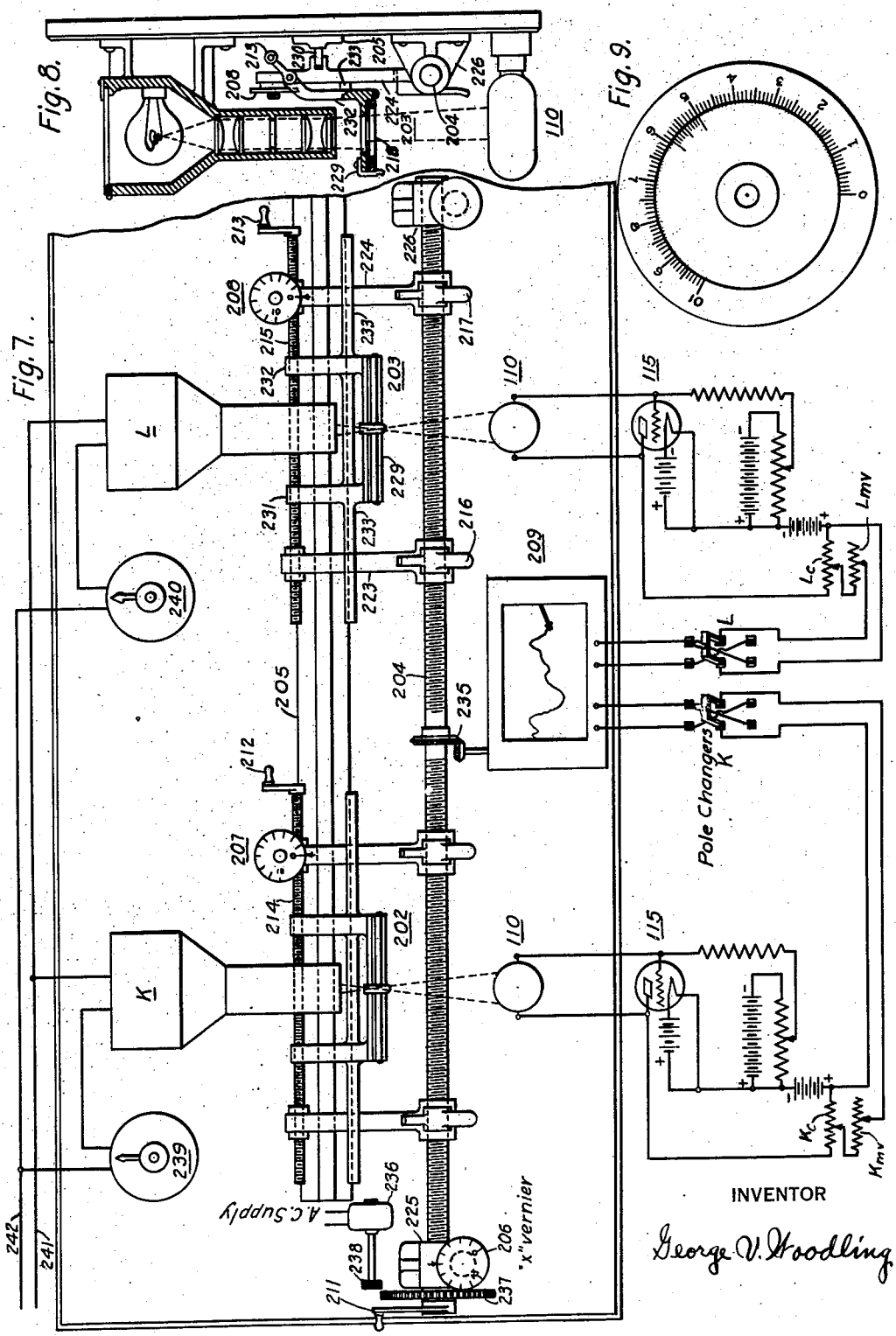

March 24, 1942.   G. V. WOODLING   2,277,285
MEASURING DEVICE
Original Filed April 22, 1932   6 Sheets-Sheet 3
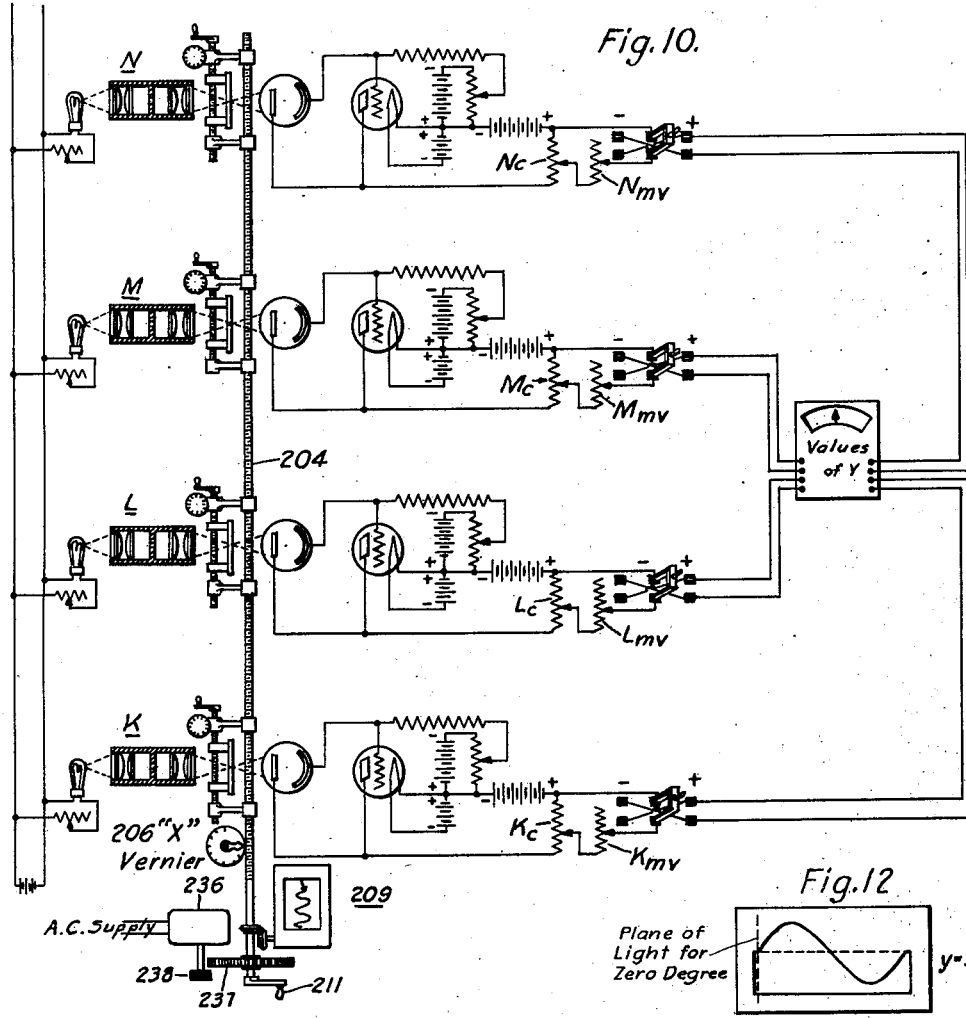
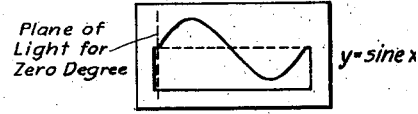
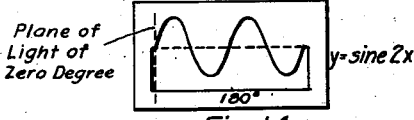
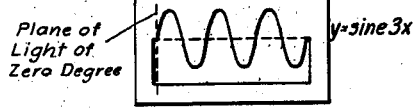
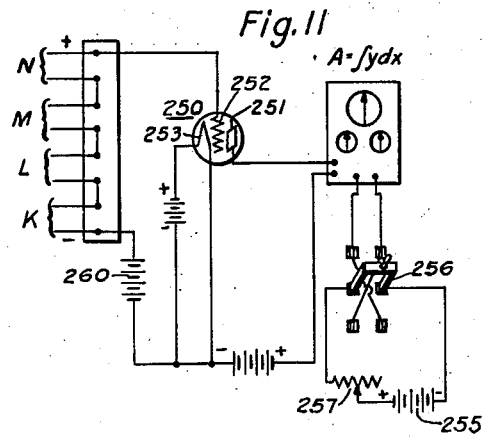
INVENTOR
George V. Woodling March 24, 1942. G. V. WOODLING 2,277,285
MEASURING DEVICE
Original Filed April 22, 1932  6 Sheets-Sheet 4
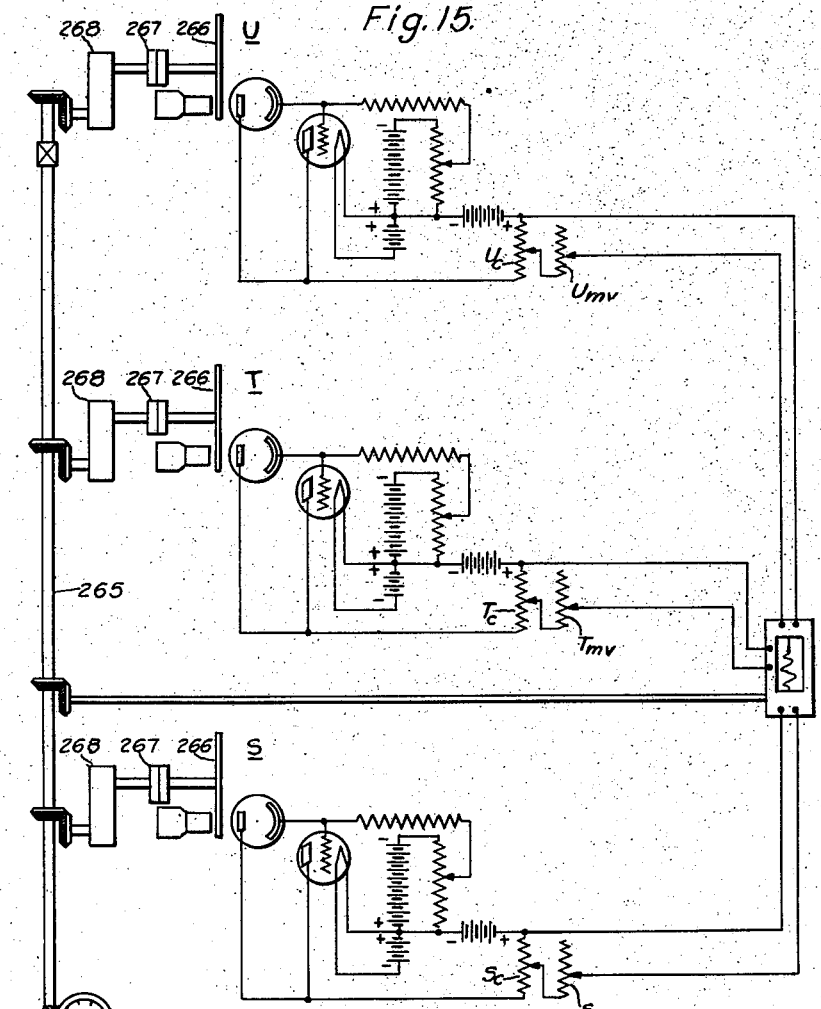
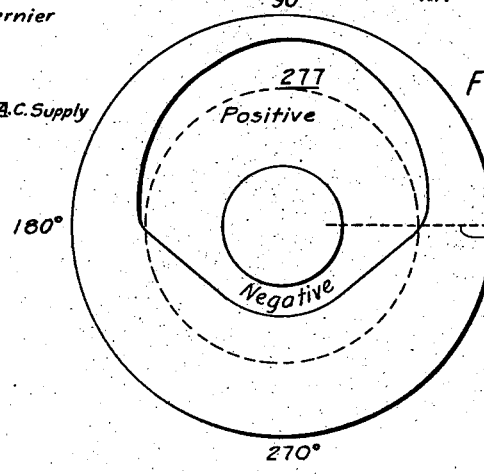
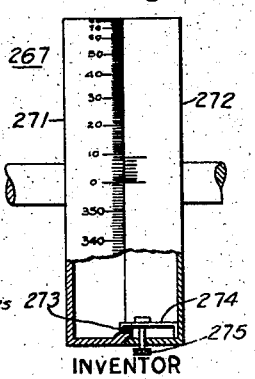
INVENTOR
George V. Woodling March 24, 1942.  G. V. WOODLING  2,277,285
MEASURING DEVICE
Original Filed April 22, 1932   6 Sheets-Sheet 5

INVENTOR
George V. Woodling

March 24, 1942.   G. V. WOODLING   2,277,285
MEASURING DEVICE
Original Filed April 22, 1932   6 Sheets-Sheet 6
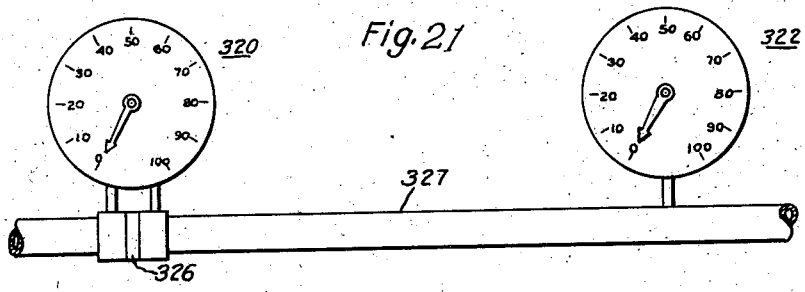
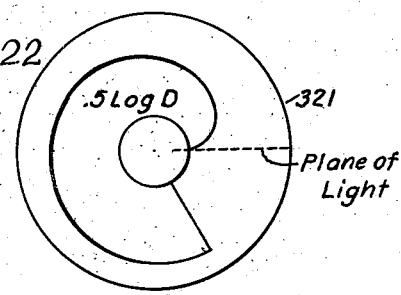
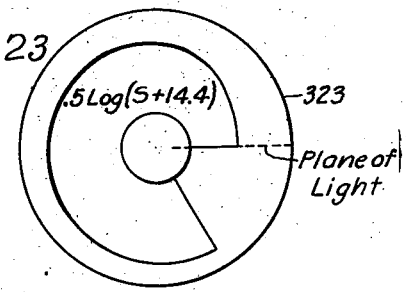
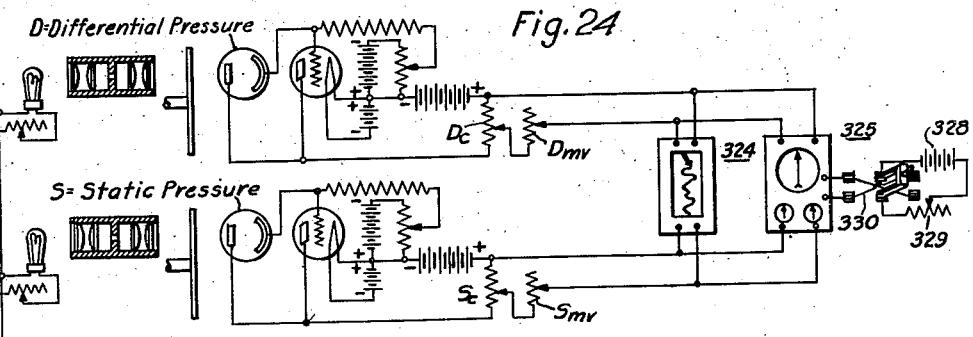
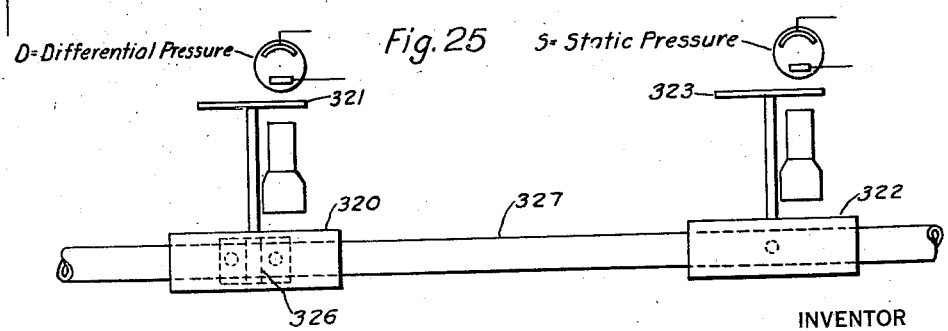
INVENTOR
George V. Woodling Patented Mar. 24, 1942

2,277,285

UNITED STATES PATENT OFFICE 2,277,285

MEASURING DEVICE

George V. Woodling, Cleveland, Ohio

Original application April 22, 1932, Serial No. 606,837. Divided and this application November 2, 1938, Serial No. 238,488

24 Claims. (Cl. 73—206)

This application is a division of my application, Serial No. 606,837, filed April 22, 1932, for Measuring and regulating devices, which matured into Patent No. 2,139,295 on December 6, 1938.

My invention relates generally to measuring devices, and more particularly to measuring devices of the photo-electric type.

As the description advances, it will be observed that the features of my invention may be readily adapted to measuring devices of various kinds. To this end, I have shown my invention in connection with a mathematical machine disposed to solve and graph equations, an integrator, and a flow meter.

An object of my invention is to provide for measuring a given condition in accordance with the amount of light falling upon a photo-electric cell, as determined by the factors affecting the given condition.

Another object of my invention is to provide for solving, graphing, differentiating, and integrating equations.

A further object of my invention is to provide for measuring the area of a plane figure.

A still further object of my invention is to provide for measuring the rate of flow of a fluid through an orifice, together with the total amount passed for a predetermined length of time.

Other objects and a fuller understanding of my invention may be had by referring to the following description, taken in connection with the accompanying drawings, in which:

Figure 1 is a diagrammatic representation of a fundamental circuit of my invention, and illustrates, in addition, a rectangular graph-member having a light transmitting portion based upon the equation, $y=f(x)^n$.

Figure 2 is a modified form of the fundamental circuit, shown in Fig. 1, and illustrates, in addition, a polar graph-member having a light transmitting portion based upon the equation, $y=f(x)^n$ Figure 3 is a graph in rectangular coordinates of an equation, $y=f(x)^n$.

Figure 4 is a rectangular graph-member having a light transmitting portion based upon the equation, $y=10(x/10)$.

Figure 5 is ar ectangular graph-member having a light transmitting portion based upon the equation, $y=10(x/10)^2$.

Figure 6 is a rectangular graph-member having a light-transmitting portion based upon the equation, $y=10(x/10)^3$.

Figure 7 is a plan view of a mathematical machine embodying features of my invention and utilizing rectangular graph-members.

Figure 8 is a side elevational view of the mathematical machine, shown in Figure 7.

Figure 9 is an enlarged view of a circular vernier, such, for example, as those employed in the mathematical machine, shown in Figure 7.

Figure 10 is a further diagrammatic view of my mathematical machine, showing four fundamental circuits connected in circuit relation with an indicating meter.

Figure 11 is a diagrammatic view of an integrating meter, together with a thermionic tube, which may be utilized with my mathematical machine for integrating the area bounded by a curve of the function that is set off in the machine, the $x$-axis and the two limits.

Figure 12 is a rectangular graph-member having a light transmitting portion based upon the equation, $y=$ sine $x$.

Figure 13 is a rectangular graph-member having a light transmitting portion based upon the equation $y=$ sine $2x$, with the negative loop shown as positive.

Figure 14 is a rectangular graph-member having a light transmitting portion based upon the equation, $y=$ sine $3x$, with the negative loop shown as positive.

Figure 15 is a modified form of my mathematical machine, which is particularly adaptable to graph sinusoidal waves, as well as a resultant curve of the several sinusoidal waves.

Figure 16 is an enlarged view of a vernier coupling; such, for example, as those utilized in the graphing machine of Figure 15.

Figure 17 is an enlarged view of the polar graph-members that are utilized in the graphing machine of Figure 15, the light transmitting portions of which being based upon the equation, $y=$ sine $x$.

Figure 18:
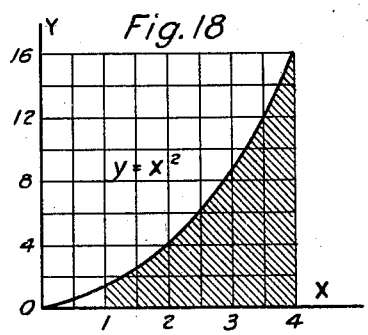
Figure 18 is the graph of an equation, $y=x^2$, with the shaded portion representing the integrated area bounded by the curve, the $x$-axis, and the limits $x=1$ and $x=4$.

(1) $y_1=3$ sine $(x+60)$;
(2) $y_2=2$ sine $(2x-150)$;
(3) $y_3=.5$ sine $(3x+90)$; and
(4) $y_r=3$ sine $(x+60)+$
     2 sine $(2x-150)+.5$ sine $(3x+90)$ Figure 21 is a view illustrating a flow pipe having an orifice, together with a differential gage for measuring the differential pressure on opposite sides of the orifice, and a static pressure gage for measuring the fluid pressure on the exit side of the orifice.

Figure 22 is an enlarged view of a polar graph-member that is disposed to be rotated by the rotational movements of the differential pressure gage for varying the amount of light falling upon a photo-electric cell.

Figure 23 is an enlarged view of a polar graph-member that is disposed to be rotated by the rotational movements of the static pressure gage for varying the amount of light falling upon a photo-electric cell.

Figure 24 is a diagrammatic view of two fundamental control circuits, cooperatively associated with the polar graph-members of Figures 22 and 23, for measuring the instantaneous flow of a fluid through the orifice, as well as the total quantity of fluid passed for a predetermined length of time, and Figure 25 is a diagrammatic plan view showing only the cooperative relation of the polar graph-members and the pressure gages, together with the light projectors and the photo-electric cells.

With reference to the drawings, Figure 1 diagrammatically illustrates a circuit embodying the fundamental features of my invention. For the purpose of convenience, this circuit, and its modified forms, will, hereinafter, be referred to as a fundamental circuit. Depending upon each particular application, my invention may comprise one or more of these fundamental circuits.

With particular reference to Figure 1, the fundamental circuit comprises, in general, a photo-electric cell 110, a light source 111 having a concentrated filament, a light projector 112, a graph-member 113 provided with a light transmitting portion 114 and transversely disposed between the light projector 112 and the photo-electric cell 110, a thermionic tube 115, together with its associated amplifying circuits, and a meter 116 for measuring the quantity of light passing through the light transmitting portion 114 and falling upon the photo-electric cell 110.

The photo-electric cell 110 is a light-sensitive device which, when connected to a circuit of the proper potential and when illuminated from a suitable source, passes a very small amount of current, of the order of micro-amperes. The photo-electric cell 110 comprises, generally, an anode 117 and a cathode 118 sealed within either an evacuated space or within a space filled with a gas at a very low pressure. The cathode 118 is constructed of a material that has the property of liberating electrons when illuminated. By impressing a potential of the proper polarity and magnitude upon the anode 117 and the cathode 118, the liberated electrons move toward the anode 117, thus effecting a passage of current in response to the light falling upon the cathode 118. Throughout the usual range of illumination, the current passed by a photo-electric cell is directly proportional to the illumination.

As is well known in the art, the feeble current that is passed by a photo-electric cell may, by means of either thermionic amplifiers or by grid-controlled glow-discharge tubes, be effectively amplified to operate electrical meters and sturdy relays. Each type of amplification has certain distinct advantages over the other.

Under correct and proper operating conditions, the output of a thermionic amplifier is directly proportional to the light falling upon the photo-electric cell, whereas this is not exactly true with grid-controlled glow-discharge tubes. However, with the proper circuits, a fair degree of proportionality can be obtained by utilizing grid-controlled glow-discharge tubes. By reason of the high degree of proportionality, the combination of the photo-electric cell and the thermionic amplifiers, provides a good light meter and may, therefore, be suitably adapted to give calibrated indications. On the other hand, the combination of the photo-electric cell and the grid-controlled glow-discharge tubes is more applicable for automatic control systems, such, for example, as regulating the field and armature current of a dynamo-electric machine. Amplifying circuits employing grid-controlled glow-discharge tubes are explained with reference to the figures in my parent patent application, Serial No. 606,837, filed April 22, 1932, which pertain to regulating the field and the armature current of a dynamo-electric machine.

Although there are many amplifying circuits utilizing thermionic amplifiers with either direct or alternating current, or with one or more stages of amplification, I have preferably illustrated in Figure 1, a simple direct current thermionic amplifying circuit having only one stage of amplification. However, it is to be understood that I do not intend to limit my invention to the illustrated embodiment.

The illustrated amplifying circuit of Figure 1 comprises, in general, the thermionic tube 115 having a filament 131, a grid 132, and a plate 133, a grid resistor 140, a grid potentiometer 141 for biasing the potential of the grid 132, relatively to the filament 131, a second potentiometer C for varying the voltage impressed upon the meter 116, a filament battery 134, a plate battery 135, and a grid potentiometer battery 136. The plate battery 135 and the grid potentiometer battery 136 are connected in series circuit relation so that the sum of their voltages, except as modified by the grid potentiometer 141, is impressed across the anode 117 and the cathode 118 of the photo-electric cell 110.

In operation, when no light is falling upon the photo-electric cell 110, it passes no current, with the result that the grid 132 of the thermionic tube 115 is sufficiently negatively charged with respect to the filament 131, as determined by the setting of the grid potentiometer 141, that the value of the impedance between the plate 133 and the filament 131 is sufficiently high that very little, if any, plate current flows through the thermionic tube 115. However, when the photo-electric cell 110 is illuminated, it passes a current for decreasing the impedance of the thermionic tube 115. This current flows from the positive terminal of the battery 135 through the potentiometer C, conductors, 151 and 152, the anode 117 and the cathode 118, of the photo-electric cell, a conductor 153, the grid resistor 140, the grid potentiometer 141, and to the battery 136. The current flowing through the photo-electric cell 110 causes a voltage drop over the grid resistor 140 in such direction as to cause the grid 132 to become less negatively charged with respect to the filament 131, with the result that the impedance of the thermionic tube 115 decreases. A decrease in the impedance of the thermionic tube 115 allows a plate current to flow from the positive terminal of the battery 135 through the potentiometer C, the plate 133 and the filament 131 of the thermionic tube, and the conductor 143 to the negative terminal of the battery 135.

The amplifying characteristics of a thermionic tube is linear, except at the two extreme ends of the grid bias voltage. Therefore, in view of the fact that the response of the photo-electric cell is also linear, the quantity of current that flows through the plate circuit of the thermionic tube 115 is linear with respect to the amount of light falling upon the photo-electric cell 110. As illustrated, by connecting the coil of a properly calibrated meter 116 in circuit relation with the potentiometer C, readings may be obtained which are directly proportional to the amount of light passing through the light transmitting portion 114 and falling upon the photo-electric cell 110.

Two well known methods are available for varying the amount of light that passes through the light transmitting portion 114. One may be termed the "linear" method, and the other the "area" method. With reference to the projector 112, the "linear" method may be described as follows. The light projector 112 comprises, in general, a cylindrical housing 119 in which are disposed, at the left end, two condensing lenses 120 and, at the right end, two objective lenses 121, and, in the middle, a transversely disposed member having a vertical narrow slit 122. By means of the condensing lenses 120 and the objective lenses 121, and the slit 122, the light from the concentrated filament of the lamp 111 is formed into a plane of light. The intensity of this plane of light may be suitably varied by the adjustable resistor 145 that is connected in series with the lamp battery 142.

As shown, this plane of light is directed perpendicularly to the plane of the transversely disposed graph-member 113. By reason of the demagnifying effect of the lenses the width of the plane of light at its focal point, being the point at which it passes through the light transmitting portion 114, is several times smaller than the width of the slit 122. The breadth or the height of the plane of light is slightly greater than the maximum height of the light transmitting portion 114. Therefore, the quantity of light falling upon the photo-electric cell 110 is determined by the amount that the graph-member 113 is transversely moved relatively to the plane of light, or, in other words, by the height of the ordinate of the light transmitting portion 114.

The shape of the light transmitting portion 114 may conform to any functional relation. If a variable $y$ depends upon a variable $x$ so that to every value of $x$ there corresponds a value of $y$, then $y$ is said to be a function of $x$, written $y=f(x)$. However, the existence of a functional relation between two quantities does not imply the possibility of giving this relation a mathematical formulation. Even though no mathematical expression for the function is known, it may still be represented graphically. As will appear later in the description, my invention may be readily adapted to measure a condition in accordance with a certain functional relation, regardless of whether or not the functional relation can be mathematically expressed, and herein resides the utility of my invention. However, the description, for the present, will be directed to those functional relations which can be mathematically expressed.

If $f(x)^n$ is any function, and we place $y=f(x)^n$, we may construct a curve, see Figure 3, which is a graph of the function. The process of plotting the relation between the function and the variable contained in the function is called graphing the function. The graphing of the function may be done by the use of rectangular or polar coordinates. The shape of the light transmitting portion 114 is such that it represents an equation of the form, $y=f(x)^n$, plotted in rectangular coordinates. Hence, the quantity of light falling upon the photo-electric cell 110 is directly proportional to the height of the plane of light, or the ordinate $y$, as it passes through the light transmitting portion 114. Accordingly, the meter 116, when properly calibrated, indicates the values of $y$, the measure of the function, for any value of the variable $x$ through which the graph-member 113 is transversely moved relatively to the plane of light.

The shape of the light transmitting portion 114 may conform to any functional relation. For instance, the shape of the light transmitting portion of the graph-member in Figure 4 is determined by the equation, $y=10(x/10)^1$; in Figure 5, by the equation, $y=10(x/10)^2$; and in Figure 6 by the equation, $y=10(x/10)^3$. Therefore, by utilizing suitable graph-members, we have a means for electrically solving equations of the form, $y=b(x)^n$, where $b$ is some numerical value to keep the maximum ordinate of the light transmitting portion within the illumination boundaries of a photo-electric cell.

However, if the equation $y=b(x)^n$, takes the form $y=ab(x)^n$, where $a$ is the coefficient of $(x)^n$, it will be necessary, by some electrical means to multiply the reading obtained on the electrical meter 116 by the value of the coefficient $a$, and the value of the numerical value $b$. This may be readily done by providing calibrated resistance taps on the potentiometers C and MV, to take care of the coefficient $a$ and the numerical value $b$, respectively. Hence, the resistance setting of the potentiometer C for the equation of the form $y=ab(x)^n$, is $a$ times the resistance setting for the equation of the form $y=b(x)^n$. Consequently, the voltage across the resistance setting of the potentiometer C for the equation of the form $y=ab(x)^n$ is $a$ times the voltage across the resistance setting for the equation of the form $y=b(x)^n$. Therefore, by providing resistance taps on the potentiometer C and MV, respectively, calibrated to take care of the coefficients of the variable $x$ and the numerical value $b$ upon which the light transmitting portion is plotted, we can directly read on the meter 116 the values of $y$ for equations of the form $y=ab(x)^n$.

The graph-member 113 may be constructed either of a thin sheet of opaque material or of a photographic film. When the graph-member 113 is constructed of a thin sheet of opaque material, the light transmitting portion 114 takes the form of an aperture, but when a photographic film is used, the light transmitting portion 114 is transparent while the surrounding portion is dark. In the case of a photographic film, it is essential that the degree of transparency be uniform throughout the light transmitting portion 114. By utilizing a photographic film, the graph-member may be plotted on an enlarged scale and reduced to a size applicable for the photo-electric cell by taking a reduced photograph of the enlarged graph-member. This makes a very accurate and convenient method of making graph-members.

The maximum height of the light transmitting portions of the graph-members, such, for example, as those illustrated in Figures 4, 5, and 6, must not exceed the illumination boundaries of a photo-electric cell. From an inspection of the light transmitting portions of the graph-members, it will be seen that, in order to keep the maximum value of the ordinate $y$ within the illumination boundaries of a photo-electric cell, the ordinate $y$ must be multiplied by some numerical value $b$. For the algebraic equations of the form, $y=a(x)^n$, a convenient expression for determining the numerical value $b$, for any value of the variable $x$, is $10(x/10)^z$. Therefore, by substituting, we have:

(1) $$y=10\left(\frac{x}{10}\right)^1=x$$

which means that the first power graph-member of Figure 4 is plotted with a numerical value of 1, (2) $$y=10\left(\frac{x}{10}\right)^2=\frac{x^2}{10}$$

which means that the second power graph-member of Figure 5 is plotted with a numerical value of 1/10, and (3) $$y=10\left(\frac{x}{10}\right)^3=\frac{x^3}{100}$$

which means that the third power graph-member of Figure 6 is plotted with a numerical value of 1/100. By referring to the tables of values accompanying the graph-members of Figures 4, 5 and 6, one observes that when $x$ is 10, $y$ is 10. Hence the maximum height of the light transmitting portions for the several graph-members is the same.

Referring again to Figures 4, 5, and 6, and at the same time keeping in mind the manner in which the light transmitting portions were plotted, it will be noted that some electrical means must be provided for taking care of the numerical value $b$. That is to say, for the second and the third power graph and with the same quantity of light falling upon the photo-electric cell 110, the deflections of the electrical meter 116 must be, respectively, 10 and 100 times the deflection for the first power graph. Although there are several electrical means for taking care of this numerical value $b$, I preferably illustrate an adjustable resistor MV, which is calibrated to take care of the numerical value for each power of the graph upon which the light transmitting portions may be plotted. For instance, for the second and third power graphs, and with the same quantity of light falling upon the photo-electric cell, the resistance setting of the adjustable resistor MV is such that the potential impressed upon the terminals of the meter 116 is respectively 10 and 100 times the potential impressed upon the terminals of the meter 116, for the first power graph. As illustrated, a pole changer is provided for taking care of the sign of each term of an equation, and its use will be pointed out later when describing the method of solving an equation of the general form.

With reference to Figure 2, a modified form of the fundamental circuit of Figure 1, and the same reference characters representing like parts, an alternating current and a graph-member plotted on the basis of polar coordinates are utilized. It will be noted that the circuits in Figure 2 are very similar to the circuits in Figure 1. A transformer 163, having a primary winding 164, connected to a suitable alternating-current supply source, and two secondary windings 165 and 167, replace the batteries 134, 135, and 136 of Figure 1. The secondary winding 165 is directly connected to the filament 131 by means of the conductors 143 and 144. As illustrated, a portion of the secondary winding 167 is connected in close circuit with a grid-potentiometer 169. For the purpose of maintaining the potential of the grid 132 negative with respect to the filament 131, the left end of the potentiometer 169 is connected by means of a conductor 170 to a mid-tap of the secondary winding 165. In other words, the grid 132 is negative with respect to the filament 131 by an amount equal to the potential difference betwen the movable pointer of the potentiometer 169 and the mid-tap of the secondary winding 165.

Therefore, the thermionic tube 115 is so connected in circuit relation with the transformer 163 that during the positive half cycles of the alternating current, the plate 133 is positive, and the grid 132 is negative with respect to the filament 131, thus giving the proper relationship for operating the thermionic tube 115. During the negative half cycles of the alternating-current, because of the rectification properties of the photo-electric cell 110 and the thermionic tube 115, they pass no current; and, consequently, it is immaterial what happens in the grid circuit during this time, so long as desirable conditions of control and bias are obtained during the positive half cycles.

In operation, when the photo-electric cell is illuminated, current, during the positive half cycles, flows from the left-hand terminal of the secondary winding 167 through the potentiometer C, the conductors 151 and 152, the anode 117 and the cathode 118 of the photo-electric cell, the conductor 153, the grid resistor 140 and the grid-potentiometer 169 to the opposite end of the secondary winding 167. The current flowing through the photo-electric cell 110 creates a drop of potential over the grid resistor 140 in a manner similar to that heretofore described with respect to the direct current circuit of Figure 1. The drop in potential across the grid resistor 140 causes the grid 132 to become less negatively charged with respect to the filament 131, with the result that the impedance of the thermionic tube 115 is, accordingly, decreased. This reduction in impedance allows plate current to flow from the left-hand terminal of the secondary winding 167, through the potentiometer C, the plate 133 and the filament 131 of the thermionic tube, the conductors 143 and 144, the secondary transformer winding 165, and the conductor 170 to the opposite end of the secondary winding 167.

The value of the current flowing through the potentiometer C is directly proportional to the amount of light falling upon the photo-electric cell 110, and, accordingly, the meter 116 indicates the values of $y$ for any value of the variable $x$, through which the polar graph-member 113 is rotated. The grid condenser 172 that is connected across the grid resistor 140 serves to maintain the effective negative grid voltage in phase with the plate voltage, for values of high grid resistances, thereby assuring the most effective use of the grid bias voltage.

As will be observed, the rotation of the polar graph-member 113 cannot exceed 360°. Inasmuch as it is convenient to have the full scale reading of the value of $x$ to be equivalent to 10 radians, it becomes necessary to construct the scale of the variable $x$ on a unit less than the true radian. With reference to the polar graph-member 113 in Figure 2, a convenient $x$ scale unit is obtained by making 300° (5.23 radians) equivalent to 10 radians. Therefore, we have the expression:

$$x=(10/5.23)x_1$$

where $x_1$ is the unit for the $x$ scale.

Also from further observation of the polar graph-member, as was likewise with the case of the rectangular graph-members, it will be seen that, in order to keep the maximum value of the radius vector within the illumination boundaries of the photo-electric cell, the radius vector, $y$, which is the measure of the function for any value of the variable $x$, must be multiplied by some "numerical value." For the algebraic equations of the form, $y=b(x)^n$, the expression $10(1/10)^n$, which is the same as that selected for the graph-members of the rectangular form, may be conveniently employed as the "numerical value."

Therefore, the first power graph in polar coordinates may be plotted upon the equation:

$$y=(10/5.23)x_1$$

the second power graph plot may be plotted upon the equation:

$$y=\frac{[(10/5.23)x_1]^2}{10}$$

and the third power graph may be plotted upon the equation:

$$y=\frac{[(10/5.23x_1)]^3}{100}$$

Therefore, when $x_1$ is 300°, $x$ is 10 radians, and $y$, the radius vector, is 10 linear units. The graphing of transcendental functions may be done in a manner similar to that described with reference to algebraic functions.

While I have illustrated the "linear" method for varying the amount of light falling upon the photo-electric cell, it is to be understood that the "area" method may, likewise, be employed to vary the amount of light in accordance with the measure of the function. With the "area" method, the graph-members are plotted such that, as they are moved relatively to the light source, the amount of light falling upon the photo-electric cell is governed by the area of such part of the light transmitting portion as may be moved into cooperative relation with the light source.

For evaluating an equation of the general form:

$$y=ax+bx^2+cx^3 \ldots px^n$$

it is necessary to provide a graph-member and a fundamental circuit for each term of the equation. To this end, the graph-members are simultaneously actuated by a common member, the displacement of which represents the values of $x$, and the fundamental circuits are connected in circuit relation to an electrical meter, calibrated to read the values of $y$, as produced by the system of fundamental circuits. Such a mathematical machine is illustrated in Figures 7 and 8. For this machine, I employ graph-members plotted in rectangular coordinates and based upon the "linear" method. For simplicity, only two graph-members and two fundamental circuits are shown, because a further showing would merely involve a duplication of the same parts.

In general, my mathematical machine comprises two light sources K and L, each disposed to project a plane of light upon their corresponding photo-electric cells 110 of the two fundamental circuits, two carriages 202 and 203 for transversely actuating the graph-members relatively to the plane of light, a main threaded shaft 204 for simultaneously actuating the carriages 202 and 203, an $x$ vernier 206 actuated by the rotation of the main shaft 204 and calibrated to indicate the values of $x$, two ancillary threaded shafts 214 and 215 for actuating the graph-members independently of the main shaft 204, two ancillary verniers 207 and 208 actuated by the rotation of the two threaded shafts 214 and 215, respectively, and a recording meter 209 driven by the main shaft 204 and calibrated to read the values of $y$, as produced by the two fundamental circuits.

As illustrated, the light sources K and L are energized from a source of supply represented by the reference characters 241 and 242. The degree of illumination may be adjusted by the adjustable rheostats 239 and 240.

The carriages 202 and 203 are disposed to be simultaneously actuated by the rotation of the main threaded shaft 204, and independently actuated by the rotation of the ancillary shafts 214 and 215. As illustrated, the ends of the main threaded shaft 204 are supported by two bearings 225 and 226. The main shaft 204 may be actuated either by the crank 211 or by the synchronous motor 236 through the illustrated gear wheels. When the motor starts, the pinion 238 moves outwardly into engagement with the gear wheel 237.

Inasmuch as the carriages 202 and 203 are alike in structural features, I will describe only the carriage designated by the reference character 203. As illustrated, the ancillary shaft 215 is connected to the main threaded shaft 204 by means of two side bars 223 and 224. The forward end of each of the side bars 223 and 224 is hollow and is carried by the main threaded shaft 204 and the rearward end is provided with a roller 230 that rides upon a longitudinal track member 205 (see Figure 8). The hollow forward end of the side bars 223 and 224 are provided with hinged threaded members 216 and 217, respectively, which threadably engage the main shaft 204, so that the carriage 203 may be adjustable longitudinally of the main shaft 204 by lifting up and disengaging the hinged members 216 and 217 from the threaded main shaft 204. As is best shown in Figure 8, the reference character 229 represents an upright support in which the graph-members, such as those shown in Figures 4, 5 and 6 may be mounted.

The support 229 is provided with a hinged door 218 that is held in closed position by means of the illustrated spring clip member. For inserting a graph-member within the support 229, it is only necessary to open the hinged door and place a graph-member in a recess provided therefor, and reclose the hinged door. In this manner, all of the graph-members are held in the same position with reference to the plane of light. The support 229 is carried by two rearwardly extending arms 231 and 232. The rearward ends of the two arms 231 and 232 are threaded to receive the ancillary threaded shaft 215 and the forward ends are supported by a transverse bar 233 which slides upon the upper surface of the two side bars 223 and 224. Therefore, by turning the crank 213, which is connected to the end of the ancillary shaft 215, the graph-members may be moved independently of the main shaft 204 and be displaced either negatively or positively with respect to a fixed reference point such, for example, as the focal point of the plane of light. The utility of this feature will be explained more fully with reference to the solving and the plotting of trigonometric functions having a phase-angle displacement with respect to each other.

The recording meter 209 is calibrated to read the simultaneous values produced by the two fundamental circuits. These circuits are the same as the one shown in Figure 1. The recording paper of the recording meter 209 is driven by the main shaft 204 through the bevel gears

235. Therefore, the speed of the recording paper is directly proportional to the speed at which the graph-members are transversely moved with respect to the plane of light. Consequently, the recording meter 209 describes a graph, in rectangular coordinates, of the function set off in the machine. If a recording meter of the circular type were utilized, there would be described a graph in polar coordinates.

In Figure 9, I have shown an enlarged view of a circular vernier such as may be used at 206, 207 and 208. Although not shown the circular vernier may be provided with a scale to read angles for solving and plotting trigonometric functions. The $x$ scale for solving algebraic functions, and being the one shown in Figure 9 is such that it indicates zero when the origin of the graph-members coincides with the plane of light, and indicates 10 when the graph-members are transversely moved their full length with respect to the plane of light. In the mid-way positions of the graph-members, as shown in Figure 7, the vernier 206 that indicates the values of $x$, reads 5. This means that the rotation of the main shaft 204 has simultaneously moved the graph-members to the left for one-half of their full length; assuming, of course, that the verniers 207 and 208 are set at zero.

The operation of my machine may be best understood by solving an algebraic equation of one term. For solving an algebraic equation of one term, only one graph-member and only one fundamental circuit is required. Suppose the equation to be solved is $4x^2=36$.

*Operations*

1. Place a second power graph-member at K, (see the graph-member in Figure 5.)
2. Set the $x$ vernier 206 and the ancillary vernier 207 at zero.
3. Set the resistance $K_c$ to 4, the coefficient of the variable $x^2$, and the resistance $K_{mv}$ to take care of the numerical value upon which the second power graph-member is plotted.
4. Set the pole charger at K to positive, the sign of the variable $x^2$.
5. Rotate the main threaded shaft 204 in a clockwise direction until the recording meter reads 36. Then, read 3, the value of $x$, on the $x$ vernier 206.

The foregoing operation, in addition to determining the value of $x$, describes a graph of the equation upon the paper of the recording meter. The solution to an equation $3x^3=24$ can be solved in the same manner, except a third power graph-member is utilized instead of the second power graph-member.

In order to evaluate an equation of the general form;

$$y=ax+bx^2+cx^3 \ldots px^n$$

it is necessary to have a graph-member and a fundamental circuit for each term of the variable of the equation to be solved. Thus, if we wish to solve the following equation;

$$y=ax+bx^2+cx^3+dx^4$$

it will be necessary to have four graph-members of first, second, third and fourth powers, respectively.

Referring to Figure 10, I diagrammatically illustrate a mathematical machine suitable for solving an equation of four terms. More than four fundamental circuits could have been shown in Figure 10, but this number is sufficient to explain the theory of solving an equation of the general form. The fundamental circuits in Figure 10 are the same as the one shown in Figure 1, or the two shown in Figure 7. In Figure 10, the fundamental circuits are connected in circuit relation to an indicating meter, instead of to a recording meter, as shown in Figure 7. However, the recording meter 209 is shown, but it is not illustrated as being connected in circuit relation to the fundamental circuits.

Suppose it is desired to solve the equation:

$$x^3+5x^2-8x=12$$

*Operations*

1. Place a first power graph-member at K; a second power graph-member at L; and a third power graph-member at M. (See graph-members in Figures 4, 5, and 6).
2. Set the $x$ vernier 206, and the ancillary verniers at K, L and M at zero.
3. (a) Set the resistance $K_c$ to 8, the coefficient of the $x$ term and the resistance $K_{mv}$ to take care of the numerical value upon which the first power graph-member is plotted.

(b) Set the resistance $L_c$ to 5, the coefficient of the $x^2$ term, and the resistance $L_{mv}$ to take care of the numerical value upon which the second power graph-member is plotted.

(c) Set the resistance $M_c$ to 1, the coefficient of the $x^3$ terms, and the resistance $M_{mv}$ to take care of the numerical value upon which the third power graph-member is plotted.

4. Set the pole changer at K to negative, the sign of the $x$ term; the pole changer at L to positive, the sign of the $x^2$ term, and the pole changer at M to positive, the sign of the $x^3$ term.
5. Rotate the main threaded shaft 204 in a clockwise direction until the indicating meter reads 12. Then, read plus 2, the value of $x$, on the $x$ vernier.

The foregoing operations give the positive roots of the equations. For determining all of the positive roots of the equation, the main shaft should be rotated until the graph-members are transversely moved for their entire length with respect to the light source. However, in this particular equation, there are no more positive roots.

The negative roots of the foregoing equation may be obtained by transforming the equation into another equation which shall have the same roots with contrary signs and solving this new equation by the machine. The equation when transformed becomes;

$$x^3-5x^2-8x=-12$$

This time, as the main shaft 204 is rotated in a clockwise direction, the electrical meter indicates 12 for two values of $x$; namely, when $x=1$, and when $x=6$. Hence, the negative roots of the original equations are $x=$ negative 1, and $x=$ negative 6. Therefore, the three roots of the equation are;

$$x=2$$
$$x=-1 \text{ and}$$
$$x=-6$$

Any other equation of the general form may be solved by my machine in the same manner. Should the values of the general equation exceed the limits or boundaries of my machine, each term of the general equation may be divided by 10, or some other suitable multiple thereof. Hence, a machine made in accordance with my invention is applicable for general equations of any form.

By the transformation of coordinates, it is possible to secure very accurate readings with a machine embodying the features of my invention. It is to be borne in mind that the transformation of coordinates never alters the position of the point in the plane; the coordinates alone change, because of the new standard of reference adopted. Suppose, for illustration, when we solve an equation for the first time by my machine, we obtain $x=6$. By substituting the quantity $(x+6)$ for $x$ in the original equation, we have a second equation which, when solved by the machine, gives the value of $x$ with reference to the line $x=6$. Suppose the value of $x$ for the second equation is .18, which could be read as 1.8 on the electrical meter with a multiplying factor of 10, then the true value of $x$ for the original equation is 6.18. This process could be carried on indefinitely until the error of the machine is reduced to a minimum.

The fact that this machine gives the instantaneous values of the function for any value of the variable, provides an easy method of determining the slope of the graph of the function that is set off in the machine. In other words, we have a means by which we can geometrically find the derivative of a function. Thus, the limit of the ratio $$\frac{\Delta y}{\Delta x}$$

as $\Delta x$ approaches zero is called the derivative of $y$ with respect to $x$. Therefore if we choose a very small unit on the $x$ vernier, as $\Delta x$ and note the change of deflection on the electrical meter, as the graph-members are simultaneously moved through the unit $\Delta x$ with reference to the light source, we obtain the slope of the function that is set off in the machine for that particular value of $x$.

Figure 19:
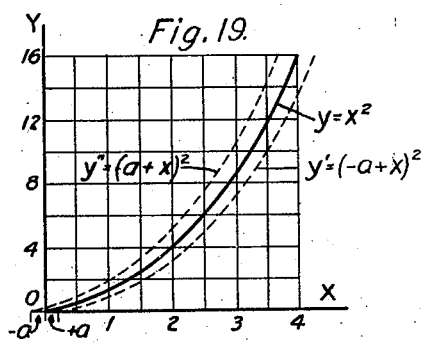
Figure 19 is a graph of an equation $y=x^2$, together with two displaced curves, $y'=(-a+x)^2$ and $y''=(a+x)^2$, all of which being shown to explain how my machine may be employed to find the derivative of a function.

While this geometrical method of finding the slope of the function at any value of $x$ is very convenient, another method may be employed. Suppose, it is desired to find the slope of the curve for all points on the curve. This method is graphically illustrated in Figure 19, the full line represents an equation of $y=x^2$. By shifting the curve $y=x^2$ a distance $a$ units to the right, we obtain the curve $y'=(-a+x)^2$. Also by shifting the curve $y=x^2$ a distance of $a$ units to the left, we obtain the equation $y''=(a+x)^2$. By letting $2a=\Delta x$, then the vertical distance between the curves, $y'$ and $y''$ represents $\Delta y$. This method may be very conveniently carried out by my mathematical machine.

Since we are to obtain the slope of the curve, $y=x^2$, we place a second power graph-member at both K and L. The graph-member at K may, by means of the vernier at K, be shifted positively a distance $a$, representing the curve $$y'=(-a+x)^2$$

Similarly, the graph-member at L may, by means of the vernier at L, be shifted negatively a distance $a$, representing the curve $y''=(a+x)^2$. Therefore, by rotating the main shaft 204 in a clockwise direction, and setting the pole changer at K to negative, and the pole changer at L to positive, we directly obtain, upon the electrical meter the difference between the curves, $y'$ and $y''$ or the value of $$\frac{\Delta y}{\Delta x}$$

for all values of $x$, when $2a=1$. By using the recording meter 209, instead of the indicating meter, the first derived graph of the equation $y=x^2$ would be described on the recording paper. The slope of any other equation may be obtained in the same manner.

Furthermore, by reason of the fact that my machine gives the instantaneous values of the function for any value of the variable, it may be employed for integrating the area bounded by a curve, the reference axis, and the two limits. For integrating purposes, since this process involves a scanning of the area under the curve at a uniform rate, it is necessary to rotate the main shaft 204 at a constant speed by means of the synchronous motor 236, and to use an electrical integrating meter, such, for example, as the one shown in Figure 11. As a modification, instead of directly connecting the electrical integrating meter to the leads coming from the fundamental circuits, I interposed a thermionic tube 250 which passes a current that is directly proportional to the resultant voltage produced by the system of fundamental circuits. In this connection, it is apparent that a thermionic tube may be utilized with both the indicating and the recording meters. Accordingly, an ordinary standard meter, properly calibrated, may be employed to measure the combined resultant effect of the fundamental circuits. The circuit connections for the thermionic tube 250 are standard. A battery 260 is provided for biasing the grid 252 negatively with respect to the filament 253, so that the thermionic tube 250 normally passes no current.

Inasmuch as we are dealing primarily with voltages, the leads coming from the fundamental electrical circuits may be connected in series, so that their resultant voltage opposes the voltage of the grid battery 260. Accordingly, the thermionic tube 250 passes a plate current for operating the integrating meter that is directly proportional to the summation of the voltages of the fundamental circuits K, L, M and N.

The other component of electrical energy for the integrating meter is provided by the battery 255. The value of the current supplied by the battery 255, when properly adjusted by the adjustable resistor 257, is maintained constant. A pole changer 256 is provided for reversing the polarity of the battery 255.

Suppose, for example, that we wish to integrate the area bounded by the parabola, $y=x^2$, the $x$-axis, and the lines $x=1$, and $x=4$, (see Figure 18).

When integrating this area by my machine, the electrical integrating meter in Figure 11 is connected to the leads coming from the fundamental circuits, and the main shaft 204 is rotated at a constant speed by the synchronous motor 236. The integrating operations are as follows:

1. Place a second power graph-member K, and set the pole changer at K to positive.

2. Set the resistance $K_c$ to 1, the coefficient of the $x^2$ term, and the resistance $K_{mv}$ to take care of the numerical value upon which the second power graph-member is plotted.

3. Adjust the reading of the integrating meter to zero. This may be done by setting the pole changer 256 to negative, thus causing the battery 255 to deliver a current of a negative potential to the integrating meter and by allowing light to fall upon any one of the photo-electric cells of the fundamental circuits until the integrating meter reverses itself to zero, and then open the pole changer 256.

4. Start the synchronous motor 236 which drives the main shaft 204 at a constant speed.

5. When the $x$ vernier reads 1, close the pole changer 256 to positive. This causes a constant current to flow in the current coil of the integrating meter while the synchronous motor 236 rotates the main shaft 204 at a constant speed.

6. Open the pole changer 256 when the $x$ vernier reads 4.

7. Read 21 on the integrating meter, the area represented by the shaded portion of Figure 18.

As is noted, this method of integration comprises a mechanical means for scanning an area bounded by a curve of the function, the $x$-axis, and the two limits.

A mathematical machine constructed in accordance with my machine finds many applications in solving electrical engineering problems. As will be noted, by utilizing a tangent graph-member and a secant graph-member, we have a quick and easy way of determining the phase-angle and the impedance of an electrical circuit when the resistance and the reactance are given. Consider the simple circuit where the resistance equals 4 ohms and reactance equals 3 ohms. Hence;

$$\text{the phase-angle} = \tan.^{-1} \tfrac{3}{4}$$

In solving this problem, we determine the phase-angle first, and then the impedance.

Operations

1. Place the tangent graph-member at K.
2. Set the pole changer of K to positive; the resistance $K_c$ to 1, and the resistance $K_{mv}$ to take care of the numerical value upon which the tangent graph-member is plotted.
3. Rotate the main shaft 204 in a clockwise direction until the electrical meter reads .75, then read 36.9°, the value of the phase-angle on the $x$ vernier.
4. Without disturbing the rotation of the main shaft 204 remove the tangent graph-member and replace it with a secant graph-member.
5. Change the resistance $K_c$ to 4, the value of the resistance of the electrical circuit, and change the resistance $K_{mv}$ to take care of the numerical value upon which the secant graph-member is plotted.
6. Read 5 on the electrical meter, the value of the impedance of the circuit.

The foregoing operations may be somewhat expedited, by placing a tangent graph-member at K, and a secant graph-member at L, and by allowing light to fall upon the photo-electric cell at K only when determining the phase-angle and allowing light to fall upon the photo-electric cell at L only when determining the value of the impedance.

Figure 20:
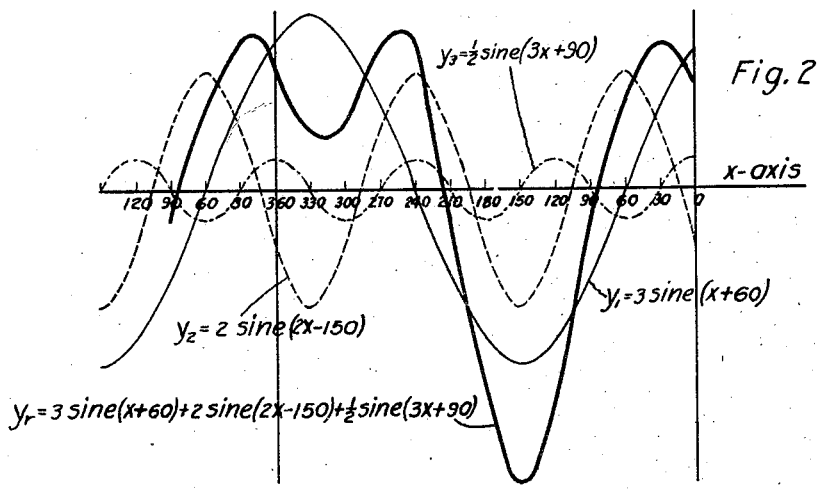
Figure 20 shows the graphs of the following equations.

Such a mathematical machine has many applications in plotting and graphing waves as encountered in alternating current circuits. For instance, a number of waves may be graphed separately or their resultant waves may be graphed by the simultaneous operation of the separate waves, set at their proper phase-angle with respect to each other. In Figure 20, I illustrate a system of curves which may be readily plotted by the utilization of my machine. The three harmonics are:

(1) $y_1 = 3 \text{ sine } (x+60)$
(2) $y_2 = 2 \text{ sine } (2x-150)$
(3) $y_3 = \tfrac{1}{2} \text{ sine } (3x+90)$ Therefore, the resultant curve $y_r$ equals:

$3 \text{ sine } (x+60) + 2 \text{ sine } (2x-150) + \tfrac{1}{2} \text{ sine } (3x+90)$ The rectangular graph-members of sine $x$, sine $2x$ and sine $3x$ shown, respectively, in Figures 12, 13, and 14 are employed for graphing the foregoing harmonics. The sinusoidal graph-members having a base line equal to 360° and they are plotted with reference to the horizontal, dotted line, as the $x$-axis. When the machine in Figure 10 is utilized for graphing curves, the indicating meter is replaced by the recording meter 209, and when the plane of light intersects the curves at the point where they cross the horizontal, dotted line, such, for example, as when the plane of light coincides with zero degrees, the hand of the recording meter 209 registers with the center reference line, or $x$-axis of the recording paper. Then, as the sinusoidal graph-members are transversely actuated with reference to the plane of light, the positive loops, being higher than the horizontal, dotted line, cause the hand of the recording meter to swing positively with reference to the $x$-axis, and the negative loops, being lower than the horizontal dotted line, cause the hand to swing negatively with reference to the $x$-axis. When the sinusoidal graph-members are transversely actuated through 360°, there is described a resultant graph on the recording paper of the recording meter 209. As illustrated, the base of the light transmitting portion of the sinusoidal graph-members is somewhat below the lower peaks of the negative loop, so that the thermionic tubes of the fundamental circuits are operated on the streight or central part of their characteristic curve.

The following is the operation of plotting the foregoing curves of Figure 20 with the machine shown in Figure 10:

1. Place a graph-member of sine $x$ at K, and set the vernier at K to a positive 60°; place a graph-member of sine $2x$ at L, and set the vernier at L to a negative 75°, and place a graphing member of sine $3x$ at M, and set the vernier at M to a positive 30°.
2. Set the resistance $K_c$ to 3, the coefficient of the term, sine $x$; the resistance $L_c$ to 2, the coefficient of the term, sine $2x$; the resistance $M_c$ to .5, the coefficient of the term, sine $3x$, and the resistances $K_{mv}$, $L_{mv}$ and $M_{mv}$ to take care of the numerical values upon which the respective graph-members are plotted.
3. Rotate the main shaft 204 until the complete cycle is described on the graph paper of the recording meter 209. However, at various points because of the initial shifting of the graph-members with reference to the plane of light, it will be necessary to re-shift the graph-members in order to describe the complete cycle.

While the foregoing mathematical machine provides a way of plotting a resultant curve, the machine is not totally automatic and care must be exercised in setting and re-shifting of the graph-members. However, in Figures 15, 16, and 17, I show a machine for automatically graphing a resultant curve. With particular reference to Figure 15, the automatic graphing machine comprises, in general three fundamental circuits S, T and U connected to a recording meter, a main shaft 255 for rotating a plurality of sinusoidal polar graph-members 266, plotted on the equation, $y = \text{sine } x$, an enlarged view of which is shown in Figure 17. The light transmitting portion 277 of the polar graph-members 266 is plotted with the dotted circle as the base line, and when the plane of light coincides with 0° and 180°, the hand of the recording meter registers with the center-reference line, or $x$- axis of the recording paper. Then as the graph-member 266 is rotated with reference to the plane of light, the positive loop, being more than the dotted base line circle, causes the hand of the recording meter to swing positively with reference to the $x$-axis, and the negative loop, being less than the dotted base line circle, causes the hand of the recording meter to swing negatively with reference to the $x$-axis of the graph-paper. Although I have shown only three fundamental circuits, it is obvious that any number may be employed, depending upon the number of the harmonic to be plotted.

As illustrated, each of the polar graph-members 266 is driven from the main shaft 265 through a set of bevel gears, a gear-change unit 268, and a vernier coupling 267, an enlarged view of which is shown in Figure 16. The gears of the gear-change unit 268 are arranged to be interchangeable, so that the speed of rotation of the polar graph-member 266 may be varied relatively to the speed of rotation of the main shaft 265. Therefore, by means of the gear-change unit 268 the polar graph-members 266 may be so rotated as to take care of the frequencies of the harmonics. That is to say, by utilizing a gear ratio of 1 to 1; 2 to 1; 3 to 1; ... $n$ to 1, we are able to take care of the terms sine $x$; sine $2x$; sine $3x$; ... sine $nx$. For graphing the cosine terms, the polar graph-members 266 are advanced 90° relatively to the main shaft. This may be accomplished, as well as making adjustments for phase-angle displacements, by means of the vernier couplings 267. Each coupling comprises two complementary flanges 271 and 272 which may be moved angularly with respect to each other.

For the purpose of giving additional strength to the coupling, the flange 271 is provided with a peripheral notch, so that the end of the flange 272 may rotatably engage the notch. On the inside of the flange 272 I provide a shoe 273 carried by the resilient member 274, and disposed to engage the inner periphery of the flange 271 by means of the illustrated bolt and adjustment nut 275. Hence, by means of this frictional locking engagement, the operator may adjust the flanges relatively to each other at any angular displacement. As illustrated, the periphery of the flange 271 is provided with a vernier scale in degrees, and the other flange 272 is provided with a vernier index.

The following are the operations for graphing the equation:

$$y = 3 \text{ sine } (x+60) + 2 \text{ sine } (2x-150) + .5 \text{ sine } (3x+90)$$

1. Set the rotation of the main shaft 265 to zero and adjust the recording meter so that the pointer rests upon the $x$-axis of the recording paper.
2. Set the resistance $S_c$ to 3. the resistance $T_c$ to 2, the resistance $U_c$ to .5, and the resistances $S_{mv}$, $T_{mv}$ and $U_{mv}$ to take care of the numerical value upon which the polar graph-members 266 are plotted.
3. Provide a gear ratio at S, 1 to 1; at T, 2 to 1; at U, 3 to 1. This takes care of the frequency of the harmonics.
4. Set the vernier coupling at S to a positive 60°; the vernier coupling at T to a negative 150°; and the vernier coupling at U to a positive 90°.
5. Rotate the main shaft either by the illustrated crank or motor.

As the main shaft 265 is rotated through 360°, there is described on the recording paper of the recording meter a resultant graph, such as the one indicated in Figure 20. The plotting of any other resultant curve may be done in the same manner.

As hereinbefore mentioned, the broad features of my invention may be readily incorporated into a device for measuring a given condition, as determined by the amount of light falling upon a plurality of photo-electric cells that are governed by the factors effecting the given condition. To this end, I have shown my invention in connection with a flow meter based upon the orifice principle (see Figures 21 to 25, inclusive).

As is well known in the art, if a restriction, such for example as a disc having an orifice (commonly referred to as an "orifice"), is provided in the pipe conducting a fluid, the pressure of the fluid in passing through the orifice is reduced. By means of this differential pressure, the rate of the flow of a fluid through the orifice may be determined. The differential pressure, however, depends not only upon the rate of flow, but also upon the specific volume of the fluid. The rate of flow may be generally expressed by the following equation:

$$Q = C\sqrt{D/V} \qquad (1)$$

where $Q$ = the weight rate of flow of the fluid
$C$ = a constant
$D$ = the differential pressure across the orifice in inches of water
$V$ = specific volume of the fluid Now V for any given fluid is a function of temperature and/or pressure. Thus, for example, in the case of water V is practically independent of pressure and may be determined if the temperature is known. For saturated vapor, such as steam, V may be determined if the pressure is known, or if the vapor is partially saturated V may be determined from the pressure and the moisture present in the vapor. For superheated vapors V is a function of pressure and temperature, as it is also in the case of the so-called "fixed gases."

If an orifice is designed for any given specific volume and the actual specific volume varies from the design value it is evident that the rate of flow as obtained from a measure of the differential pressure will be in error unless a proper correction is applied. My invention, therefore, not only contemplates a flow meter solely responsive to differential pressure, but one in which the readings are corrected for changes in specific volume of the flowing fluid, so that the true weight rate of flow is exhibited. Inasmuch as a direct measure of specific volume of a flowing fluid is difficult, if not impossible, to obtain under the conditions ordinarily met with in practice, I usually prefer to determine the proper correction to be applied by measuring one or more of the conditions of the flowing fluid from which the specific volume may be determined, as has been explained. However, it will be evident to those familiar with the art that if the specific volume or density of the flowing fluid can be conveniently measured, the apparatus I have disclosed for correcting the readings of the flow meter could be actuated from such measurements.

As an illustrative embodiment I have chosen to describe my invention adapted to measure a so-called fixed gas," such as nitrogen or air, where the specific volume is a function of temperature and pressure. For the sake of simplicity I have further assumed a constant temperature, so that variations in specific volume are due to changes in pressure. However, it will be evident from what is to follow that by the addition of further fundamental circuits changes in temperature or other conditions affecting the specific volume could be properly compensated. Now in the case of a fixed gas, due to the pressure, volume relationships, as expressed in Boyle's law, Equation 1 may be written:

$$Q = C\sqrt{D(S+14.4)}$$

where:
S = the static pressure of the gas
14.4 = an assumed atmospheric pressure By expressing the preceding equation logarithmically, we have a mathematical expression, which may be readily evaluated by means of my invention. Thus, the equation $$\log Q = \log C + .5 \log D + .5 \log (S+14.4)$$

With reference to Figures 21 to 25, inclusive, the flow meter comprises, in general, a disc 326 having an orifice inserted in a pipe 327, a differential pressure gage 320 for measuring the difference in pressure on opposite sides of the orifice, a polar graph-member 321 having a light transmitting portion based upon the expression .5 log D, a static pressure gage 322 for indicating the static pressure on the exit side of the orifice, a polar graph-member 323 having a light transmitting portion based upon the expression, .5 log (S+14.4), two fundamental circuits, a recording meter 324 for recording the instantaneous flow of the gas through the orifice, and an integrating meter 325 for measuring the quantity of gas passed through the orifice during a predetermined interval of time.

As illustrated in Figure 25, the polar graph-member 321 is actuated relatively to the photo-electric cell D by the differential pressure gage 320, and the polar graph-member 323 is actuated relatively to the photo-electric cell S by the static pressure gage 322. Accordingly, the amount of light falling upon the photo-electric cell D is directly proportional to the expression .5 log D, and the amount of light falling upon the photo-electric cell S is directly proportional to the expression .5 log (S+14.4). The expression, log C being a constant value, may be taken care of in the adjustment of the fundamental circuits and in the calibration of the recording and integrating meter.

As illustrated, the energy for the current coil of the integrating meter 325 is supplied from a battery 328 through a pole changer 330 and an adjustable resistor 329. However, by replacing the integrating meter 325 with an ampere-hour meter, it would not be necessary to provide an additional source of energy, such as the battery 328.

In order to read the value of the quantity of gas, Q, directly, the scales of the recording meter 324 and the integrating meter 325 are based upon the antilogarithm of the logarithmic sum of the two fundamental circuits. Therefore, the recording meter 324 records the instantaneous flow of the gas, and the integrating meter 325 registers the amount passed during a predetermined interval of time.

It is evident that if the pressure of the gas flowing through the conduit 327 is substantially constant so that the error introduced is negligible, the fundamental circuit responsive to pressure and the apparatus associated therewith may be dispensed with. That is to say, the recording and registering devices 324 and 325 respectively may be responsive solely to the fundamental circuit controlled by differential pressure. With such an arrangement the graph member 321 would preferably be provided with a light transmitting portion varying in height as the square root of the angular motion there and accordingly passing a plane of light to the light sensitive device D of a height variable in correspondence with the square root of changes in differential pressure. Thus, the electrical effect impressed upon the recording and the registering devices 324 and 325 would then be in direct proportion to the rate of fluid flow. It is apparent, however, that I may, as described with reference to Figures 1–6, inclusive, give any desired shape to the light transmitting portion of the graph member so that any desired lineal or non-lineal function may be obtained between the magnitude of a variable and the electrical effect produced.

Attention may further be called to the fact that there are in reality very few "fixed gases." Substantially all gases show a departure from Boyle's law over a wide range in pressure. In the case of some gases, for example natural gas, the departure from Boyle's law, or the "supercompressibility of the gas" has been determined. By warping the light transmitting portion of the graph-member shown in Figure 32, it is evident that I may properly correct for such deviations from the perfect relationship.

Inasmuch as the restriction 326 and differential pressure responsive device are per se old in the art, I have chosen, for the sake of simplicity, to illustrate them more or less diagrammatically. For a more complete discussion, of such devices reference may be made to the report, "Fluid Meters, Their Theory and Application," published by The American Society of Mechanical Engineers.

It is to be pointed out that the fundamental circuits used in my invention are merely illustrative, and accordingly they may take other forms. In the illustrated form, the constancy or calibration of the circuits remain very accurate over a reasonable length of time. However, should the operating conditions require that no change in the calibration take place over an extended period of time, a null method may be employed, which counterbalances any change in the calibration. As is further apparent, the application of my invention is not limited to a flow meter, but may be applied to measure any condition involving a set of factors which affect the given condition.

Since certain changes in my invention may be made without departing from the spirit and scope thereof it is intended that all matters contained in the foregoing description and shown in the accompanying drawings, shall be interpreted as illustrative and not in a limiting sense.

I claim as my invention:

1. In combination, a plurality of light-sensitive devices, light source means for influencing the light sensitive devices, a current responsive device, circuit connections interconnecting the current responsive device and each of the light-sensitive devices, and a light varying means for each light-sensitive device, each said light-sensitive device and the light varying means therefor being in alignment with the light directed toward the light-sensitive device, said alignment being variable between two spaced limits, and individual means for varying the said alignment between said two spaced limits to individually govern the amount of light falling upon each light-sensitive device, thus making the current responsive device influenced by the total amount of light passed by the individual light varying means upon the plurality of light-sensitive devices, each said light varying means individually intercepting and being positioned laterally with respect to the light directed toward each light-sensitive device, said individual varying means being independently movable with respect to each other.

2. In combination, a plurality of light-sensitive devices, light source means for influencing the light sensitive devices, a current responsive device, circuit connections interconnecting the current responsive device and each of the light-sensitive devices, a light varying means for each light-sensitive device, each said light-sensitive device and the light varying means therefor being in alignment with the light directed toward the light-sensitive device, said alignment being variable between two spaced limits, individual means for varying the said alignment between said two spaced limits to individually govern the amount of light falling upon each light-sensitive device, thus making the current responsive device influenced by the total amount of light passed by the individual light varying means upon the plurality of light-sensitive devices, each said light varying means individually intercepting and being positioned laterally with respect to the light directed toward each light-sensitive device, said individual varying means being independently movable with respect to each other, and common means for governing the plurality of individual varying means.

3. In combination, a plurality of light-sensitive devices, light source means for influencing the light sensitive devices, a current responsive device, circuit connections interconnecting the current responsive device and each of the light-sensitive devices, a light varying means for each light-sensitive device, each said light-sensitive device and the light varying means therefor being in alignment with the light directed toward the light-sensitive device, said alignment being variable between two spaced limits, individual means for varying the said alignment between said two spaced limits to individually govern the amount of light falling upon each light-sensitive device, thus making the current responsive device influenced by the total amount of light passed by the individual light varying means upon the plurality of light-sensitive devices, each said light varying means individually intercepting and being positioned laterally with respect to the light directed toward each light-sensitive device, said individual varying means being independently movable with respect to each other, common means for governing the plurality of individual varying means, and means for adjustably setting the plurality of individual varying means with reference to the common governing means.

4. In combination, a plurality of light sensitive devices, light source means for influencing the light sensitive devices, a current responsive device, circuit connections interconnecting the current responsive device and each of the light-sensitive devices, a light varying means for each light-sensitive device, each said light-sensitive device and the light varying means therefor being in alignment with the light directed toward the light-sensitive device, said alignment being variable between two spaced limits, and individual means for varying the said alignment between said two spaced limits to individually govern the amount of light falling upon each light-sensitive device, thus making the current responsive device influenced by the total amount of light passed by the individual light varying means upon the plurality of light-sensitive devices, each said light varying means individually intercepting and being positioned laterally with respect to the light directed toward each light-sensitive device, said individual varying means being independently movable with respect to each other, and means to adjustably modify the circuit connections to modify the influence that the light-sensitive devices have on the current responsive device.

5. In combination, a plurality of light-sensitive devices, light source means for influencing the light sensitive devices, a current responsive device, circuit connections interconnecting the current responsive device and each of the light-sensitive devices, a light varying means for each light-sensitive device, each said light-sensitive device and the light varying means therefor being in alignment with the light directed toward the light-sensitive device, said alignment being variable between two spaced limits, and individual means for varying the said alignment between said two spaced limits to individually govern the amount of light falling upon each light-sensitive device, thus making the current responsive device influenced by the total amount of light passed by the individual light varying means upon the plurality of light-sensitive devices, each said light varying means individually intercepting and being positioned laterally with respect to the light directed toward each light-sensitive device, said individual varying means being independently movable with respect to each other, means to adjustably modify the circuit connections to modify the influence that the light-sensitive devices have on the current responsive device, and pole changing means interconnecting the current responsive device and the circuit connections to modify the resultant effect of the light-sensitive devices upon the current responsive device.

6. In combination, a plurality of light-sensitive devices, light source means for influencing the light sensitive devices, a current responsive device, circuit connections interconnecting the current responsive device and each of the light-sensitive devices, a light varying means for each light-sensitive device, each said light-sensitive device and the light varying means therefor being in alignment with the light directed toward the light-sensitive device, said alignment being variable between two spaced limits, and individual means for varying the said alignment between said two spaced limits to individually govern the amount of light falling upon each light-sensitive device, thus making the current responsive device influenced by the total amount of light passed by the individual light varying means upon the plurality of light-sensitive devices, each said light varying means individually intercepting and being positioned laterally with respect to the light directed toward each light-sensitive device, said individual varying means being independently movable with respect to each other, and means independent of the light-sensitive devices for affecting the current responsive device 7. In combination, a current responsive device, and a plurality of circuit connections including light-sensitive devices for influencing the current responsive device, means for directing a plurality of light rays upon the light-sensitive devices, means for modifying the light rays independently of each other, each said modifying means being movable between two spaced limits, and individual means for actuating each of the said modifying means between said two spaced limits to individually govern the amount of light falling upon each light-sensitive device.

8. An arrangement for measuring the resultant effect of an operating condition having a plurality of independent variables comprising, in combination, a current responsive device for measuring the said resultant effect, a plurality of light-sensitive devices responsive to the operating condition, light source means for influencing the light-sensitive devices, a plurality of light varying means for the light-sensitive devices and being respectively responsive to the plurality of independent variables of the operating condition, said light varying means being independently movable with respect to each other, circuit connections interconnecting the plurality of light-sensitive devices and the current responsive device to make the current responsive device responsive to the resultant effect of the plurality of independent variables of the operating condition.

9. In combination, a plurality of light-sensitive devices, means for directing a plurality of light rays upon the light-sensitive devices, a graph-member movably positioned between each of the light-sensitive devices and the light rays, each of said graph-members having a light transmitting portion for varying the amount of light falling upon each light-sensitive device, means for simultaneously and independently moving the graph-members relatively to the light rays and their respective light-sensitive devices, an electrical meter, a source of electrical energy, and adjustable amplifying means interconnecting the light-sensitive devices, the source of electrical energy and the electrical meter, said meter being calibrated to measure the algebraic sum of the light falling upon the light-sensitive devices.

10. In combination, a plurality of light-sensitive devices, means for directing a plurality of light rays upon the light-sensitive devices, a graph-member movably positioned between each of the light-sensitive devices and the light rays, each of said graph-members having a light transmitting portion for varying the amount of light falling upon each light-sensitive device, means for simultaneously and independently moving the graph-members relatively to the light rays and their respective light-sensitive devices at a substantially uniform rate of speed, an electrical integrating meter, a source of electrical energy, and adjustable amplifying means interconnecting the light-sensitive devices, the source of electrical energy and the electrical integrating meter, said meter being calibrated to measure the integrated amount of light falling upon the light-sensitive devices.

11. A flow meter for measuring both the instantaneous flow of a fluid or a gas through a pipe and the total amount of fluid or gas passed during a predetermined interval of time comprising, in combination, a flow pipe having a restriction for creating a drop in pressure, a differential pressure gage for measuring the difference in pressure of the fluid or gas on the opposite sides of the restriction, a static pressure gage for measuring the static pressure of the fluid or gas on the exit side of the restriction, two light-sensitive devices, light sources for influencing the light-sensitive devices, means for adjustably varying the intensity of the light sources, a graph-member having a light transmitting portion based upon the expression $.5 \log D$ for varying the quantity of light falling upon one of the light-sensitive devices, said graph-member being actuated in accordance with the reading of the differential pressure gage, a second graph-member having a light transmitting portion based upon the expression $.5 \log (S+14.4)$ for varying the quantity of light falling upon the other of said light-sensitive devices, said second graph-member being actuated in accordance with the reading of the static pressure gage, a source of electrical energy, an electrical meter for indicating the instantaneous flow of the fluid or gas through the pipe, an integrating meter having two actuating windings for measuring the total amount of fluid of gas passed for a predetermined interval of time, amplifying means of the thermionic type for interconnecting the light-sensitive devices, the source of electrical energy, the indicating meter and one of the windings of the integrating meter, and an independent source of current for supplying current to the other winding of the integrating meter.

12. In combination, a current responsive device having a plurality of windings, a plurality of light-sensitive devices, light source means for influencing the light-sensitive devices, a plurality of circuit connections interconnecting respectively the windings of the current responsive device and the light-sensitive devices, and light varying means for each light-sensitive device, each said light-sensitive device and the light varying means therefor being in alignment with the light directed toward the light-sensitive device, said alignment being variable between two spaced limits, and individual means for varying the said alignment between said two spaced limits to individually govern the amount of light falling upon each light-sensitive device, thus making the current responsive device influenced by the total amount of light passed by the individual light varying means upon the plurality of light-sensitive devices, each said light varying means individually intercepting and being positioned laterally with respect to the light directed toward each light-sensitive device, said individual varying means being independently movable with respect to each other.

13. Apparatus for compensating the measurement of a quantity for variations in a condition under which said quantity is measured, comprising, a first light sensitive device for producing a current corresponding to the quantity of light directed thereon, means for directing a quantity of light on said device corresponding to the logarithm of the magnitude of the quantity, a second light sensitive device for producing a current corresponding to the quantity of light directed thereon, means for directing a quantity of light on said second light sensitive device corresponding to the logarithm of the magnitude of the condition, and means for exhibiting the antilogarithm of the sum of the currents produced by said first and second light sensitive devices.

14. Apparatus for compensating the measurement of a quantity for variations in a condition under which said quantity is measured, comprising means including light-sensitive means and light varying means for producing an electrical effect corresponding to the logarithm of the quantity, means including light-sensitive means and light varying means for producing an electrical effect corresponding to the logarithm of the condition, and electrical means including electrical circuits connected to the light-sensitive devices for determining the sum of said effects.

15. Apparatus for producing an effect corresponding to the product of a plurality of variables comprising, a plurality of means each including light-sensitive means and light varying means for producing respectively an electrical effect corresponding to the logarithm of each of said variables, and electrical means for determining the sum of the effects.

16. Apparatus comprising a plurality of photo-electric cells, light source means for the photo-electric cells, means for varying the quantity of light directed upon each of said photo-electric cells in correspondence with the magnitude of a variable, and means positioned in correspondence with the sum of the electric currents produced by all of the photo-electric cells, each said photo-electric cell and the light varying means therefor being in alignment with the light directed toward the photo-electric cell, said alignment being variable between two spaced limits, and individual means for varying the said alignment between said two spaced limits to individually govern the amount of light falling upon each photo-electric cell, each said light varying means individually intercepting and being positioned laterally with respect to the light directed toward each photo-electric cell, said individual varying means being independently movable with respect to each other.

17. In combination, a plurality of light-sensitive devices, means for directing a plurality of light rays upon the light-sensitive devices, a graph-member movably positioned between each of the light-sensitive devices and the light rays, each said graph-member having a light transmitting portion based upon a functional relationship, individual means for so moving each of the graph-members relatively to the light rays and the light-sensitive device with which each said graph-member is associated that any one position of all of the graph-members represents a value of the variable contained in the functional relationships of the plurality of light transmitting portions, a current responsive device, and circuit connections interconnecting the current responsive device and each of the light-sensitive devices, thus making the current responsive device influenced by the amount of light falling upon the plurality of light-sensitive devices.

18. In combination, a flow pipe having a restriction, a differential pressure gage, a static pressure gage, two light-sensitive devices, means for directing a plurality of light rays upon the light-sensitive devices, means for varying the quantity of light falling upon one of the light-sensitive devices in accordance with the readings of the differential pressure gage, means for varying the quantity of light falling upon the other light-sensitive device in accordance with the readings of the static pressure gage, an electrical meter, and electrical amplifying means interconnecting the light-sensitive devices and the electrical meter.

19. In a device for producing a resultant electrical effect varying in proportion to the magnitude of a plurality of variables, in combination, light source means, a plurality of light sensitive devices each producing an electrical effect in proportion to the quantity of light passing from said light source means to each of said light sensitive devices, and individual means under the respective control of each of said variables for varying respectively the quantity of light passing from said light source means to each of said light sensitive devices in correspondence with the magnitude of the variables.

20. Apparatus for compensating the measurement of a quantity for variations in a condition under which said quantity is measured, comprising, means including light-sensitive means and light varying means for producing an electrical current corresponding in magnitude to the logarithm of the magnitude of the quantity, means including light-sensitive means and light varying means for producing an electric current corresponding in magnitude to the logarithm of the magnitude of the condition, and means including electrical circuits connected to the light-sensitive devices for determining the sum of the effects.

21. A rate of flow meter for measuring the rate of flow of fluid passing through a conduit, comprising, a plurality of movable means responsive to the fluid in the conduit, light source means, a plurality of light-sensitive devices, exhibiting means governed by the light-sensitive devices and actuated in correspondence with the quantity of light passing from said light source means to said light-sensitive devices to give the rate of flow of the fluid in the conduit, and means for varying the quantity of light passing from said light source means to said light-sensitive devices in response to the plurality of movable means.

22. Apparatus for determining the product of a plurality of variables, comprising, a separate means for determining the magnitude of each of the variables, a light-sensitive device associated with each of said means producing an electric current corresponding to the quantity of light directed thereon, means including a graph-member positioned by each of said means for varying the quantity of light directed upon each of the light-sensitive devices in correspondence with the logarithm of the magnitude of the associated variable, and means for determining the sum of the currents produced by all of the light-sensitive devices.

23. An arrangement for measuring the flow of a fluid current through a conduit having a restriction comprising, in combination, an electric current responsive meter for measuring the flow of the fluid current through the conduit, a plurality of pressure responsive devices influenced by the fluid current at spaced locations in the conduit, one of said pressure responsive devices being influenced by the fluid current on opposite sides of the restriction and another of said pressure responsive devices being influenced by the fluid current on one side only of the restriction, means for producing a plurality of light rays and modifying same by the pressure responsive devices, a plurality of light-sensitive devices respectively responsive to the light rays as modified by the pressure responsive devices, circuit connections interconnecting the plurality of light-sensitive devices and the electric current responsive meter to make the electric current responsive meter responsive to the flow of fluid current in the conduit.

24. In combination, a plurality of light-sensitive devices, means for directing a plurality of light rays upon the light-sensitive devices, a plurality of light varying means movably positioned respectively between each of the light-sensitive devices and the plurality of light rays, each said light varying means being independently movable with respect to each other and being disposed to independently vary the amount of light falling upon the light-sensitive device with which each said light varying means is associated in accordance with a functional relationship, and means for so moving each of the light varying means relatively to the light source and the light-sensitive devices that any one position of all of the light varying means represents a value of the variable contained in the functional relationships of the plurality of light varying means.

GEORGE V. WOODLING.